US010815915B2

(12) United States Patent
Andre et al.

(10) Patent No.: US 10,815,915 B2
(45) Date of Patent: Oct. 27, 2020

(54) SYSTEMS AND METHODS FOR DETERMINING AN ENGINE COOL-DOWN PERIOD AND GROUNDS MAINTENANCE VEHICLES INCORPORATING SAME

(71) Applicant: EXMARK MANUFACTURING COMPANY, INCORPORATED, Beatrice, NE (US)

(72) Inventors: Timothy D. Andre, Firth, NE (US); Christian S. C. Bryant, Lincoln, NE (US)

(73) Assignee: EXMARK MANUFACTURING COMPANY, INC., Beatrice, NE (US)

( * ) Notice: Subject to any disclaimer, the term of this patent is extended or adjusted under 35 U.S.C. 154(b) by 7 days.

(21) Appl. No.: 16/123,053

(22) Filed: Sep. 6, 2018

(65) Prior Publication Data
US 2020/0080501 A1    Mar. 12, 2020

(51) Int. Cl.
| F02N 11/10 | (2006.01) |
| F02D 35/02 | (2006.01) |
| A01D 101/00 | (2006.01) |
| A01D 34/43 | (2006.01) |

(52) U.S. Cl.
CPC .............. *F02D 35/02* (2013.01); *A01D 34/43* (2013.01); *A01D 2101/00* (2013.01); *F01P 2025/08* (2013.01); *F01P 2025/62* (2013.01)

(58) Field of Classification Search
CPC .... F02N 11/10; F01P 2025/62; F01P 2025/08
See application file for complete search history.

(56) References Cited

U.S. PATENT DOCUMENTS

| 4,648,364 A | * | 3/1987 | Wills ...................... F02B 77/08 |
| | | | 123/198 D |
| 4,656,973 A | | 4/1987 | Endres |
| 4,940,965 A | * | 7/1990 | Umehara .............. F02B 61/045 |
| | | | 340/460 |

(Continued)

FOREIGN PATENT DOCUMENTS

| JP | H 0315624 A | 1/1991 |
| JP | H 7279682 A2 | 10/1995 |

(Continued)

OTHER PUBLICATIONS

Apexi, "Auto Timer for NA & Turbo," Instruction Manual, Part Name: Apex Auto Timer, Part Code: 408-A011; APEXERA Co., Ltd., [retrieved on Feb. 11, 2020]. Retrieved from the Internet: <URL: apexi-usa.com/manuals/electronics/timer_wiring.pdf> Believed available at least as early as 2012; 2 pages.

(Continued)

*Primary Examiner* — Thomas N Moulis
(74) *Attorney, Agent, or Firm* — Mueting Raasch Group (57) ABSTRACT

Systems and methods for determining an idle, recommended cool-down period (RCDP) for a prime mover of a grounds maintenance vehicle. Delaying engine shutdown until after expiration of the RCDP allows engine components to adequately cool. In some embodiments, systems and methods may provide a quantitative indication of the time remaining in the RCDP, while other embodiments may notify an operator that a re-start of the engine is necessary to continue cool-down.

24 Claims, 5 Drawing Sheets

(56) References Cited

U.S. PATENT DOCUMENTS

| | | | |
|---|---|---|---|
| 5,070,832 A * | 12/1991 | Hapka | F01M 1/22 123/198 D |
| 5,154,150 A * | 10/1992 | Vieira | F01M 1/24 123/198 D |
| 5,664,539 A * | 9/1997 | Vieira | F01M 1/24 123/198 DB |
| 6,055,470 A | 4/2000 | Londot et al. | |
| 7,287,501 B2 | 10/2007 | Yamada | |
| 7,669,393 B2 | 3/2010 | Park et al. | |
| 8,095,291 B2 * | 1/2012 | Christen | B60W 10/06 701/102 |
| 8,160,804 B2 | 4/2012 | Chominsky et al. | |
| 8,739,751 B2 | 6/2014 | Stoffels et al. | |
| 9,404,464 B2 | 8/2016 | Hull et al. | |
| 2004/0027336 A1 | 2/2004 | Ishii et al. | |
| 2006/0048735 A1 * | 3/2006 | Umezu | E02F 9/2246 123/179.4 |
| 2012/0123666 A1 * | 5/2012 | Stoffels | F02D 23/00 701/113 |
| 2012/0227378 A1 * | 9/2012 | Koestler | F01N 3/023 60/274 |
| 2013/0061575 A1 * | 3/2013 | Korenaga | F02D 41/0065 60/278 |
| 2014/0318759 A1 * | 10/2014 | Ellis | F02C 7/185 165/271 |
| 2015/0075490 A1 | 3/2015 | Hull et al. | |
| 2015/0171662 A1 | 6/2015 | Lathrop et al. | |
| 2017/0196164 A1 | 7/2017 | Bryant et al. | |
| 2019/0234288 A1 * | 8/2019 | Lyons | F01P 7/081 |

FOREIGN PATENT DOCUMENTS

| | | |
|---|---|---|
| JP | 2526288 B2 | 8/1996 |
| JP | 3125883 U | 10/2006 |

OTHER PUBLICATIONS

Markmann, "Turbo Timers" Datasheet. Copyright: 2017. Available at least as early as Oct. 18, 2017; 2 pages.

Yanmar, Diesel Engine Model No. 3TNV80FT. Datasheet. [online]. Yanmar Co., Ltd. [retrieved on Feb. 11, 2020]. Retrieved from the Internet: <URL:yanmarindustrial.eu/theme/yanmarportal/uploadedFiles/Industrial/productDownloads/Diesel-Engines/3TNV80FT.pdf> Available at least as early as Oct. 18, 2017; 4 pages.

* cited by examiner

SYSTEMS AND METHODS FOR DETERMINING AN ENGINE COOL-DOWN PERIOD AND GROUNDS MAINTENANCE VEHICLES INCORPORATING SAME

The present disclosure is directed to grounds (e.g., turf) turf maintenance vehicles and, more particularly, to systems and methods for determining an engine recommended cool-down period (RCDP) to expire before engine shutdown.

BACKGROUND

Outdoor grounds maintenance equipment such as lawn mowers and the like are known. This equipment typically includes a prime mover such as an internal combustion engine. Such engines may reach, under certain operating conditions, relatively high temperatures. To ensure adequate cooling, it is often recommended to let the engine run at idle speed for a period of time before shutdown. Such idle operation allows various cooling systems, e.g., fans, circulating fluids, etc. to continue operation (under low engine load) until the engine reaches a desired shutdown temperature.

This cool-down process has particular benefit to turf maintenance vehicles equipped with turbocharged engines as ensuring adequate cool-down periods may extend turbocharger life. Turbochargers are driven by exhaust gases and spin at high rates of speed (e.g., tens of thousands of revolutions per minute (RPM)). The bearings supporting the turbocharger impeller shaft are often lubricated and cooled by circulating engine oil flow which terminates when the engine is shut off. If the engine is shut off immediately after operating at high temperatures and/or under high load, the hot bearings may then burn the surrounding oil, leaving carbon deposits. Over time, these deposits may lead to premature bearing failure.

However, operators may not always allow adequate cool-down to occur before shutting the engine down. This is primarily attributable to a lack of awareness regarding the potential long-term damage that may occur, or because operators are unaware of an appropriate engine idle time before shutting down.

SUMMARY

Embodiments described herein may provide a method for identifying a cool-down period for a prime mover of a grounds maintenance vehicle. For example, the method may include periodically measuring and recording one or both of a temperature of and a load on the prime mover during a sample period of time, and calculating, with an electronic controller (EC) associated with the vehicle, one or both of a load function of the prime mover and a temperature function of the prime mover. The load function is based at least in part on the periodic measurements of load on the prime mover during the sample period of time, and the temperature function is based at least in part on the periodic measurements of temperature of the prime mover during the sample period. The method also includes: calculating, with the EC, a recommended cool-down period (RCDP) to expire before shutdown of the prime mover should occur, wherein the RCDP is based upon one or both of the load function and the temperature function; and issuing, with the EC, a notification indicative of the RCDP.

In another embodiment, a method for determining a cool-down period for a prime mover of a grounds maintenance vehicle is provided, wherein the method includes at a time interval, measuring and storing, with an electronic controller (EC) associated with the vehicle, one or both of a temperature of and a load on the prime mover. The method further includes: selecting a sample period of time over which the prime mover has operated, the sample period of time containing at least two time intervals; and determining, with the EC, one or both of a load function of the prime mover, and a temperature function of the prime mover. The load function is based at least in part upon the load measured and recorded during the sample period of time, and the temperature function is based at least in part upon the temperature measured and recorded during the sample period of time. The method further includes: calculating, with the EC, a recommended cool-down period (RCDP) to expire before shutdown of the prime mover should occur, wherein the RCDP is based upon one or both of the load function and the temperature function; and issuing, with the EC, a notification indicative of the RCDP.

In yet another embodiment, a grounds maintenance vehicle is provided that includes: a chassis; ground-engaging members supporting the chassis upon a ground surface; an implement attached to the chassis and adapted to perform a turf maintenance function; a prime mover supported by the chassis and adapted to power the implement; and an electronic controller (EC) associated with the prime mover. The EC is adapted to periodically measure and record one or both of a load parameter and a temperature parameter of the prime mover. The EC is further adapted to: select a sample period of time over which the prime mover has operated; and determine one or both of a load function of the prime mover, and a temperature function of the prime mover. The load function is based at least in part upon the load parameter as periodically measured and recorded during the sample period of time. The temperature function is based at least in part upon the temperature parameter as periodically measured and recorded during the sample period of time. The EC is further adapted to: calculate a variable recommended cool-down period (RCDP) based upon one or both of the load function and the temperature function; and issue a notification indicative of the RCDP.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated herein, are certainly contemplated.

All headings and subheadings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about."

Generally speaking, embodiments of the present disclosure are directed to grounds (e.g., turf) maintenance vehicles such as lawn mowers and, more particularly, to systems and methods for inhibiting premature shut down of a prime mover (e.g., internal combustion engine, electric motor, or any other device that converts energy from an energy source into mechanical energy) via calculating or otherwise identifying/determining a recommended cool-down period (RCDP) for which the prime mover should continue to operate at idle before it is shut down. Premature shutdown may adversely impact engine components by terminating a flow of cooling fluid (e.g., air, liquid) before such components have adequately cooled. The negative impact of premature shutdown is particularly problematic in turf maintenance vehicle engines as the latter operate at relatively high duty cycles as compared to, for example, road vehicles. In some embodiments, systems and methods in accordance with embodiments of the present disclosure may provide an indicator (e.g., a visual display) or timer informing the operator of the RCDP that should expire before the engine is shut down, and/or provide a warning that the engine should be re-started to permit adequate cooling if the engine is shut down prior to expiration of the recommended cool-down period.

As used herein, the term "load" refers to a parameter indicative of work done by a prime mover, e.g., by an internal combustion engine. For example, load can be determined from an analysis of one or more of: engine output torque, intake manifold pressure, fuel injector duty cycle, throttle position, and mass air flow. "Temperature," as used herein refers to a temperature of the prime mover (measured at most any location) and may include, coolant temperature, oil temperature, exhaust temperature, or most any other temperature measurement indicative of engine temperature.

In some embodiments, systems and methods as described herein are directed to turf maintenance vehicles that incorporate an electronic controller (EC). The EC is adapted to control, based on detected operator inputs and sensed vehicle parameters, various functions of the vehicle and/or provide various information to an operator through an interactive display (ID) in communication with the EC. Examples of such a system are described in, for example, U.S. Pat Pub. No. 2017-0196164 to Bryant et al.

The EC may, among other tasks, be adapted to receive information indicative of load and/or temperature and take actions as described herein based upon receipt of such information. While the EC is described herein as an independent controller that manages multiple vehicle systems, RCDP determination systems in accordance with embodiments of the present disclosure may also be incorporated into a dedicated controller, or into a controller specifically associated with the prime mover (e.g., into an engine controller). For example, the prime mover may include its own engine controller that provides information regarding various parameters including load, temperature, engine speed, fuel utilization, etc. (see, e.g., Yanmar engine model number 3TNV80FT distributed by Yanmar America Corp. of Adairsville, Ga., USA). In this case, the EC may indirectly obtain these data (e.g., load and temperature) via signals received from the engine controller.

Figure 1:
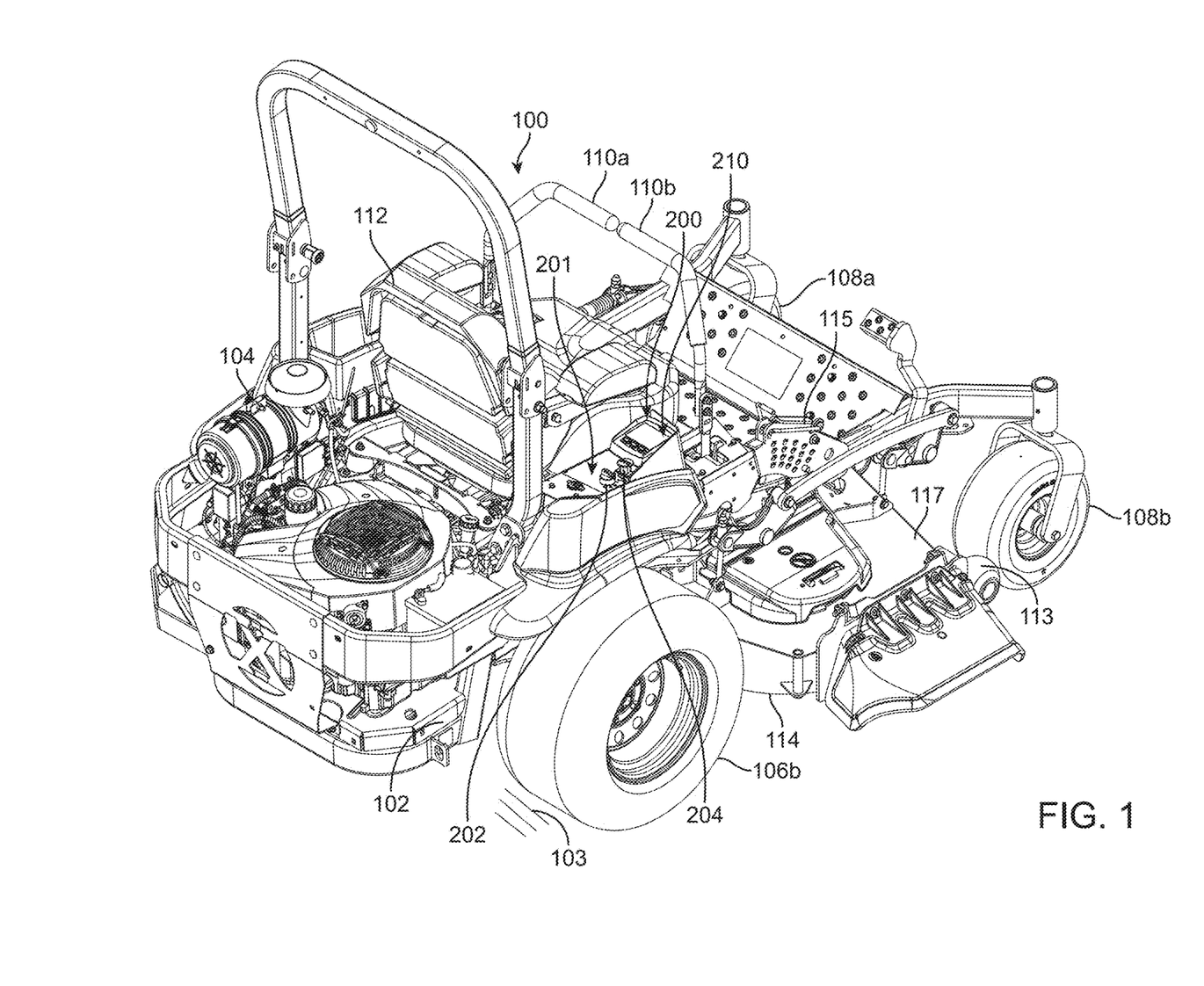
FIG. 1 illustrates a turf maintenance vehicle (e.g., a riding lawn mower) incorporating an engine cool-down determination system in accordance with embodiments of the present disclosure.

With reference to the figures of the drawing, wherein like reference numerals designate like parts and assemblies throughout the several views, FIG. 1 illustrates a turf maintenance vehicle in accordance with exemplary embodiments of the present disclosure. While shown in this view as a self-propelled, turf maintenance vehicle, e.g., a zero-turning-radius riding lawn mower 100 (also referred to herein simply as a "vehicle" or "mower"), such a configuration is not limiting. That is, while embodiments are described herein with respect to a riding mower, those of skill in the art will realize that this disclosure is equally applicable to other types of mowers, as well as to other types of turf maintenance vehicles (e.g., aerators, spreader/sprayers, dethatchers, debris management systems (e.g., blowers, vacuums, sweeper, etc.), general purpose utility vehicles, and the like) and other grounds (e.g., non-turf) maintenance vehicles without limitation.

It is noted that the term "comprises" and variations thereof do not have a limiting meaning where these terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective of one operating the mower 100 while the mower is in an operating configuration, e.g., while the mower 100 is positioned such that wheels 106 and 108 rest upon a generally horizontal ground surface 103 as shown in FIG. 1. These terms are used only to simplify the description, however, and not to limit the interpretation of any embodiment described.

Still further, the suffixes "a" and "b" may be used throughout this description to denote various left- and right-side parts/features, respectively. However, in most pertinent respects, the parts/features denoted with "a" and "b" suffixes are substantially identical to, or mirror images of, one another. It is understood that, unless otherwise noted, the description of an individual part/feature (e.g., part/feature identified with an "a" suffix) also applies to the other part/feature (e.g., part/feature identified with a "b" suffix). Similarly, the description of a part/feature identified with no suffix may apply, unless noted otherwise, to both the corresponding left and right part/feature.

As shown in FIG. 1, the mower 100 may include a frame or chassis 102 that supports a prime mover. The prime mover may, in the embodiment shown, be configured as an internal combustion (e.g., turbocharged diesel) engine 104 (although other power sources, e.g., electric motors, are also possible). The chassis 102 may be supported upon the ground surface 103 by ground-engaging members that, in one embodiment, include left and right ground-engaging drive wheels 106 coupled to left and right sides of a rear portion of the mower 100 (e.g., only right drive wheel 106b visible, but left drive wheel is generally a mirror image (see also FIG. 3)). The drive wheels 106 may be independently powered by the engine (e.g., via one or more hydraulic motors, transmissions, transaxles, or the equivalent) so that the drive wheels 106 may independently rotate (relative to the chassis) and selectively propel the mower 100 over the ground surface 103. While a single prime mover (e.g., engine 104) may power both the vehicle wheels and an implement (e.g., cutting deck), other embodiments may utilize two or more prime movers (e.g., different prime movers for propulsion and for implement power) without departing from the scope of this disclosure.

One or more controls, e.g., left and right drive control levers 110 (left lever 110a, right lever 110b) may also be provided. The drive control levers 110 are pivotally coupled to the mower such that they may pivot forwardly and rearwardly under the control of an operator located upon an operator platform, e.g., operator's seat 112. The drive control levers 110 are operable to independently control speed and direction of their respective drive wheels 106 via manipulation of the mower's drive system as is known in the art. While illustrated herein as incorporating separate drive control levers 110, other controls, e.g., single or multiple joysticks or joystick-type levers, steering wheels, etc. may also be used without departing from the scope of the disclosure. In the illustrated embodiment, a pair of passive ground-engaging members (e.g., front swiveling caster wheels 108a, 108b) may support a front portion of the mower 100 relative to the ground surface 103. Of course, other drive configurations (e.g., actively steered front and/or rear wheels, tri-wheel configurations) and vehicles using ground-engaging members other than wheels (e.g., tracks, rollers) are certainly contemplated within the scope of this disclosure.

An implement adapted to perform a maintenance task, e.g., a lawn mower cutting deck 114, may be connected to, or otherwise carried by, the chassis 102 of the mower 100, e.g., generally between the drive wheels 106 and the caster wheels 108. The cutting deck 114 may include a deck housing 117 that partially defines an enclosure forming a downwardly-opening cutting chamber (not shown). The cutting chamber may partially surround one or more rotatable cutting blades (also not shown), each attached to a blade spindle assembly as is known in the art. Of course, other cutting decks (e.g., out-front decks, towed decks, reel units, etc.), as well as other implements, are contemplated within the scope of this disclosure.

During operation, power is selectively delivered to the cutting deck 114 (e.g., to the spindle assemblies) and the drive wheels 106, whereby the cutting blades rotate at a speed sufficient to sever grass and other vegetation as the deck passes over the ground surface 103. Typically, the cutting deck 114 includes an operator-selectable height-of-cut control system 115 to allow deck height adjustment relative to the ground surface 103. The cutting deck 114 may optionally include anti-scalp rollers 113 as shown in FIG. 1 to assist in reducing inadvertent deck/ground contact.

Figure 2:
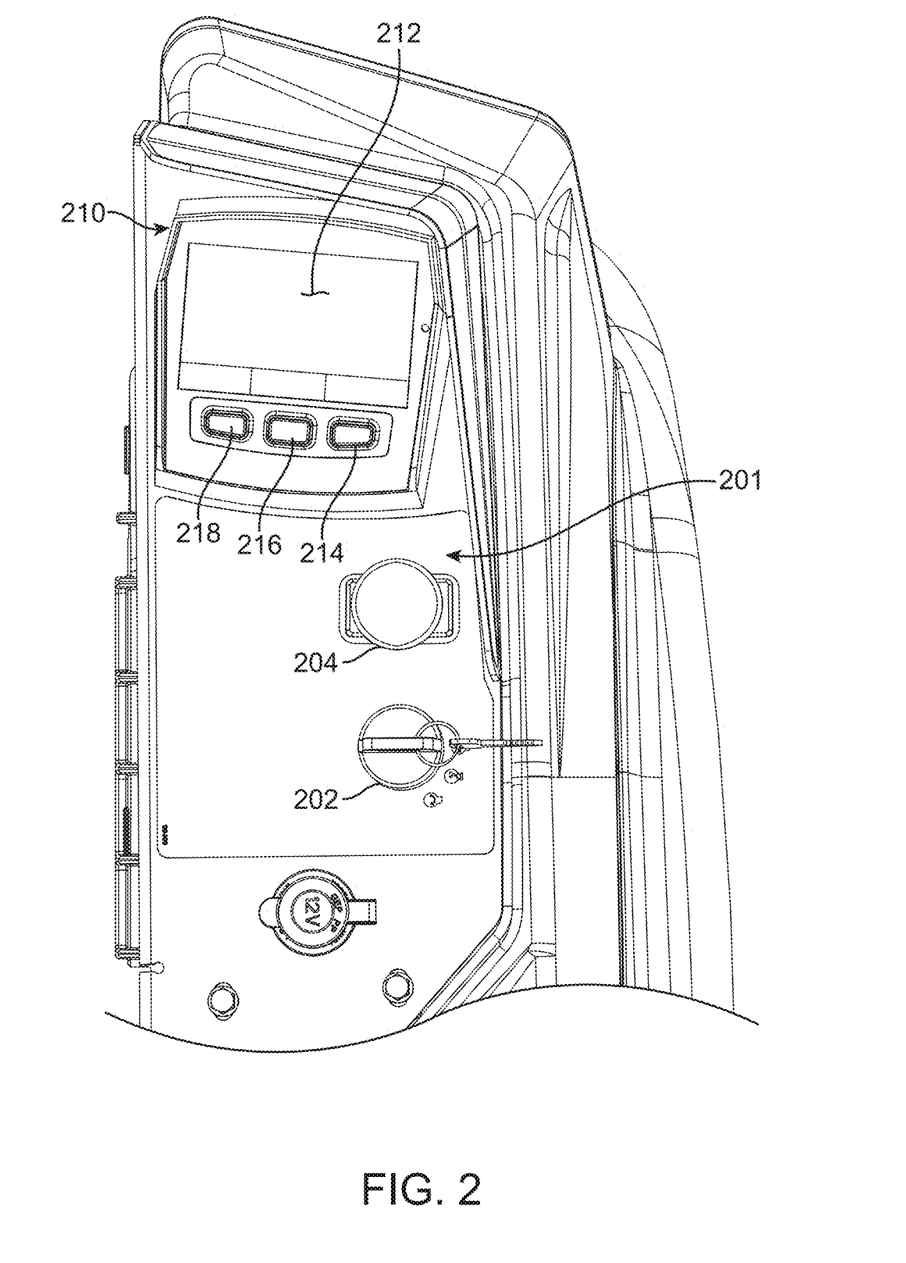
FIG. 2 is an enlarged partial view of a vehicle control area isolated from the remainder of the vehicle of FIG. 1, the control area illustrating an exemplary input/output (I/O) device, the I/O device configured as an interactive display (ID)

The mower 100 may also include a control system 200, an embodiment of which is now described. As shown in FIG. 1, the control system 200 may include a control area or panel 201, an exemplary embodiment of which is illustrated in more detail in FIG. 2. The control panel 201 may be positioned on the mower at a location that is conveniently accessible to the operator while sitting in the operator's seat 112 (see FIG. 1). While not wishing to be bound to any specific configuration, the control panel 201 may include operator-selectable controls (e.g., switches) configured to provide inputs to the control system 200, an embodiment of which is shown schematically in FIG. 3. For example, the control panel 201 may include a key/ignition switch 202 (not shown in FIG. 3) for starting the engine 104 or otherwise activating the vehicle's electrical system. Moreover, the control panel may include a display screen 212 associated with an interactive display (ID) 210. The ID may present vehicle information including, but not limited to, accumulated engine run time (hour meter), engine temperature, engine RPM, fuel level, interlock (e.g., PTO (clutch) mechanism, park brake, etc.) status, and other messages helpful to vehicle operation/maintenance. Moreover, the EC 200 may incorporate therein a RCDP determination system in accordance with embodiments of the present disclosure. As a result, the ID 210 may also provide information regarding RCDP.

In the illustrated embodiment, the control panel 201 may also include a user-selectable PTO engagement switch 204. The exemplary PTO engagement switch 204 may be configured as a two-setting (e.g., push (off state) and pull (on state)) mechanical switch. While the PTO engagement switch 204 (as well as other switches described herein) is described and illustrated herein as a mechanical switch that physically moves between its different switch positions, the term "switch," as used herein, is understood to encompass most any device that may allow actuation of a device or system or otherwise selectively allow a change in setting of the device or system. For example, switches as described herein may be non-movable switches such as capacitive sense and optical switches. In still other embodiments, "switch" may refer to other types of moving or non-moving actuation devices including, for example, touch screen elements, pressure-sensitive elements, and the like. As a result, the term "position" (as used herein with respect to a switch), is understood to also encompass any distinct manipulation or output provided by a non-movable switch. Moreover, the term "movable" and its variations (as again used herein to describe aspects of a switch), are understood to include any manipulation of the switch that results in altering the switch's setting or output, regardless of whether this manipulation is accompanied by actual physical movement of the switch.

The control panel 201 may further include the ID 210. The ID 210 may form an interface for interacting with the EC (which is indicated by reference numeral 220 in FIG. 3) and various vehicle systems. In addition to the screen 212, the ID also includes, in one embodiment, one or more (e.g., three) discrete inputs or input elements that allow operator selection/interaction with the information presented on the screen 212. In some embodiments, the inputs are configured as three physical, push-button switches 214, 216, and 218 whose particular function changes in correspondence with information presented on the screen 212. However, as indicated above, the input elements could take most any form (e.g., touch screen elements or other types of mechanical or optical switches) without departing from the scope of this disclosure. While illustrated herein as two separate components, the EC and ID may be constructed as one integral module.

As further described below, the system 200 (e.g., the EC 220) may, in addition to performing RCDP determination and notification functions, monitor various other functions and processes regarding vehicle operation. For example, the EC may monitor vehicle parameters via one or more sensors or switch(es) 223 (see FIG. 3). These sensor(s)/switch(es) 223 may include (but are not limited to): a PTO current sensor; a voltage sensor; an engine oil pressure sensor; an engine oil temperature sensor; an operator presence sensor (e.g., seat switch); a drive lever 110 position (e.g., neutral) sensor; a ground speed sensor; parking brake position sensor; a cutting deck speed sensor 116; etc. The signals from these sensors/switch(es) 223, which may be connected to a vehicle Controller Area Network (CAN) bus, may, among other uses, be utilized as inputs to other vehicle functions, e.g., they may operate as interlocks that must be satisfied before various mower operations begin.

Figure 3:
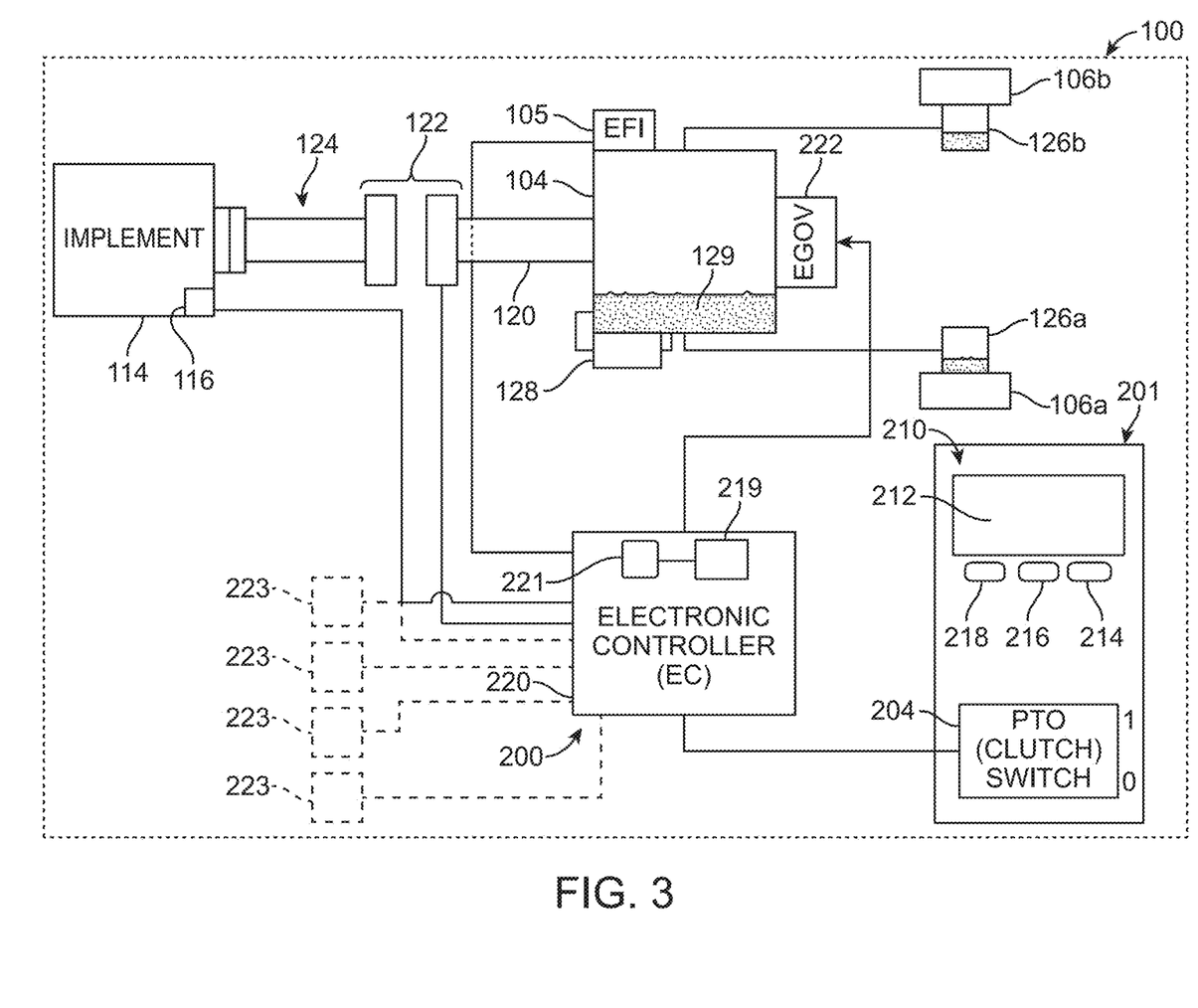
FIG. 3 is a schematic view of vehicle components illustrating aspects of an engine cool-down determination system in accordance with embodiments of the present disclosure.

As shown in FIG. 3, the EC 220, which may be carried on the chassis 102, may include a processor 221, memory 219, and other components necessary or beneficial to EC operation. The memory 219 may include computer-readable instructions that, when executed, e.g., by the processor 221, cause the EC 220 to perform various functions. The memory 219 may include any volatile, non-volatile, magnetic, optical, and/or electrical media, such as a random access memory (RAM), read-only memory (ROM), non-volatile RAM (NVRAM), electrically-erasable programmable ROM (EEPROM), flash memory, and/or any other digital media. While shown as both being incorporated into the EC 220, the memory and the processor could be contained in separate modules. Moreover, the EC 220 could be combined with an engine-specific control module so that all electronic functions of the vehicle and engine are combined into one component.

The processor 221 of the EC 220 may include any one or more of a microprocessor, a controller, a digital signal processor (DSP), an application specific integrated circuit (ASIC), a field-programmable gate array (FPGA), and/or equivalent discrete or integrated logic circuitry. In some examples, the processor 221 may include multiple components, such as any combination of one or more microprocessors, one or more controllers, one or more DSPs, one or more ASICs, and/or one or more FPGAs, as well as other discrete or integrated logic circuitry. The functions attributed to the EC 220/processor 221 herein may be embodied as software, firmware, hardware, or any combination thereof. While described herein as a processor-based system, an alternative EC could utilize other components such as relays and timers to achieve the desired results, either alone or in combination with a microprocessor-based system.

In one or more embodiments, the exemplary systems, methods, and interfaces may be implemented using one or more computer programs using a computing apparatus such as the processor 221 and memory 219. Program code and/or logic described herein may be applied to input data to perform functionality described herein and generate desired output information. The output information may be applied as an input to one or more other devices and/or methods as described herein or as would be applied in a known fashion.

In view of the above, it will be readily apparent that the EC functionality as described herein may be implemented in any manner known to one skilled in the art.

FIG. 3 is an exemplary, schematic diagram of portions of the control system 200 of the mower 100. As shown herein, the mower 100 may be configured as a zero-radius-turning mower driven by a wheel drive system having dual hydrostatic transmissions 126 (126a, 126b), each powered by the engine 104 (e.g., via one or more drive belts, not shown). Each transmission 126 may independently control the speed and direction of its respective drive wheel 106 based upon input provided by the operator, e.g., via the respective drive control levers 110 (see FIG. 1). Accordingly, the mower may be directed over the ground surface 103 in the desired direction and at the desired speed via the wheel drive system. Of course, other drive systems, e.g., direct drive electric motors, are possible without departing from the scope of this disclosure.

To selectively provide power to the cutting deck 114 (or other implement), the engine 104 may include an output or drive shaft 120 configured to operatively couple to, and decouple from, an input of an implement drive system 124 under the control of an engagement mechanism or PTO 122. In one embodiment, the implement drive system 124 (which could be, e.g., a belt drive or a shaft drive system) may be connected to the implement (e.g., to the cutting deck 114) and selectively rotated by the engine 104 when the PTO 122 (disposed between the implement drive system and the drive shaft 120 of the engine) is energized or otherwise engaged. As stated elsewhere herein, the deck 114 could alternatively be powered by a separate (dedicated) electric motor.

As used herein, the term "PTO" may include most any controlled engagement system including, for example, a conventional electro-magnetic clutch, a continuously variable transmission device, or any other equivalent power transmission system. In embodiments wherein the PTO is configured as a clutch, the PTO may be energized (e.g., the PTO may be engaged (placed into an engaged state) whereby it operatively connects or couples an output of the engine to an input of the implement/implement drive system 124 to provide power to the latter) by an electric current provided to the clutch, producing a magnetic field that draws two opposing clutch components (see, e.g., FIG. 3) tightly together, effectively permitting transmission of torque through the clutch. To de-energize the PTO 122 (e.g., to disengage the clutch (place it into a disengaged state) whereby the engine is disconnected or de-coupled from the implement/implement drive system), the electric current is terminated. Once the current is terminated, the clutch components may separate, mechanically disconnecting or de-coupling the implement drive system 124 from the drive shaft 120.

In the illustrated embodiment of FIG. 3, the engine 104 may include an electronic governor (EGOV) 222 and, optionally, an electronic fuel-injection (EFI) system 105, wherein the EGOV is capable of changing or otherwise regulating engine speed. As used herein, the term "electronic governor" or "EGOV" may include most any system operable to electrically control and/or regulate engine speed. Moreover, a system incorporating an EGOV in accordance with embodiments of the present disclosure may be used with or without an EFI system. For example, EGOV can be used with a diesel engine and with a carbureted engine without issue. The engine 104 may also include a turbocharger 128 that is cooled by recirculating engine oil 129.

While described above in the context of an engine using an electronic governor, such a configuration is not limiting.

For example, embodiments of the present disclosure may find application to engines having mechanical governors as well as to non-governed engines.

As also shown in FIG. 3, the control system 200 may include, among other components, the control panel 201 and its associated controls (e.g., PTO switch 204, ID 210 (including switches 214, 216, and 218)), as well as the EC 220. The EC 220 is configured to receive electrical input signals from, among others, the switches 204, 214, 216, and 218. The EC 220 may then transmit, based upon pre-programmed logic, electrical command signals to the engine 104 (e.g., an engine speed command (signal) to the EGOV 222) as described herein, as well as to the PTO 122 (e.g., a PTO command (signal)). For example, when the operator engages the PTO switch 204, the EC may receive a signal and command the PTO 122 to engage. In some embodiments, the EC 220 may vary engine speed in accordance with a predefined engagement profile as the PTO is engaged.

Once the PTO 122 is engaged, the mower 100 may be propelled over the ground surface to perform the grass cutting function. During such operation of the mower 100, conditions including, for example, steep slopes and tall (or wet) grass may increase the load on the engine 104. That is, certain operating conditions may require the engine to increase output to maintain desired engine/cutting blade speed and/or ground speed.

Operation of the engine 104 at higher load correspondingly increases heat of various engine components. For example, higher engine load may cause higher temperature of an engine turbocharger. Turbochargers are driven by the exhaust gases and thus operate at temperatures typically higher than other engine components. As described elsewhere herein, turbocharger bearings are often cooled by re-circulated engine oil. If the engine is not idled for a sufficient period of time after operating at high load, the bearings may not adequately cool. Stagnant oil near the bearings may then overheat, leaving deposits on the bearings that can ultimately reduce bearing life. Accordingly, it is recommended by most engine manufacturers to allow the engine to run at idle for a period of time to allow adequate cooling of the bearings. Adequate cool-down periods are beneficial to the life of other engine components as well.

To address premature shutdown, systems and methods in accordance with embodiments of the present disclosure may calculate or otherwise determine, in real-time, the RCDP based upon parameters representative of engine load and temperature. A notification of the RCDP may then be provided to the vehicle operator, e.g., via the ID 210. In some embodiments, the notification may be quantitative, providing a graphical or numeric countdown timer of the time remaining until the RCDP expires. Moreover, systems and methods in accordance with embodiments of the present disclosure may issue a warning to the operator to restart the engine if it is shut down prior to the expiration of the RCDP, and log a fault (e.g., in the memory 219) if the engine is not restarted within a predetermined period of time.

Generally speaking, an exemplary system and method may determine the RCDP as shown in Equation 1 below:

$$RCDP=[[f(L)]+[g(T)]]*MCDP \quad (1)$$

where:
RCDP=recommended cool-down period;
f(L)=function (variable) of engine load;
g(T)=function (variable) of engine temperature (e.g., coolant, oil, exhaust, etc.); and
MCDP=engine manufacturer's recommended cool-down period.

The sum of f(L) and g(T) may be between 0 and 1 such that the RCDP does not exceed the MCDP. Moreover, while the exemplary embodiment illustrated herein determines RCDP based upon both a function of engine load ("load function") and a function of engine temperature ("temperature function"), such a configuration is not limiting. For example, determining RCDP may be accomplished using only one of f(L) and g(T) (i.e., one of f(L) and g(T) may be equal to 0 in Equation 1 above) without departing from the scope of this disclosure.

In some embodiments, f(L) represents a load ratio equal to a portion of a sample period of time (as determined by the EC) at which the engine is operating at or above a threshold load (e.g., at or above 75% of maximum rated load) divided by the actual sample period of time (the "sample period"). For example, if the sample period is 5 minutes and the engine has been at or above 75% of maximum load for 3 of those 5 minutes, the variable f(L) would be 0.6. While not wishing to be bound to any specific embodiment, the sample period may be a moving window of time (of fixed or variable duration) that, at any point in time, is identified as an immediately preceding period of operation (e.g., the last 5 minutes).

g(T) may represent a temperature ratio equal to a maximum measured temperature (Tmax) that occurred during the sample period, divided by a maximum allowable temperature (Tallow), the latter which may be specified by the engine manufacturer. In some embodiments, a temperature compensation factor TC may be subtracted from Tmax and Tallow to allow fine-tuning of the effect of g(T). While different temperature compensation factors could apply separately to Tmax and Tallow, they may, in some embodiments, be equal to one another. For instance, in one embodiment, the temperature compensation factor may be equal to a thermostat opening temperature of an associated liquid-cooled engine.

To permit weighing the effects of f(L) and g(T), weight factors may also be applied. For instance, a load weight factor x and a temperature weight factor y may be used to increase/decrease the influence of f(L) and g(T), respectively, in the calculation of RCDP.

Accordingly, in some embodiments, Equation 1 (i.e., RCDP) may be expressed as shown in Equation 2 below:

$$RCDP = \left[\left[\frac{L}{SP}\right]*x + \left[\frac{Tmax - TC1}{Tallow - TC2}\right]*y\right]*MCDP \quad (2)$$

where:
L=time operating at or above a load threshold during a sample period of time (e.g., seconds);
SP=sample period of time (e.g., seconds);
x=load weight factor;
Tmax=maximum measured temperature during the sample period of time (e.g., degrees Fahrenheit (F));
TC1=first temperature compensation factor;
Tallow=maximum allowable temperature (e.g., degrees F.);
TC2=second temperature compensation factor (which may be equal to TC1);
y=temperature weight factor; and
MCDP=engine manufacturer's recommended cool-down period.

For example, assuming the sample period of time is 5 minutes, L is 3 minutes, Tmax is 180 degrees F., Tallow is 200 degrees F., and MCDP is 5 minutes, x is 0.3, y is 0.7, and TC1 and TC2 are both zero, RCDP would be approximately 4 minutes.

Figure 4:
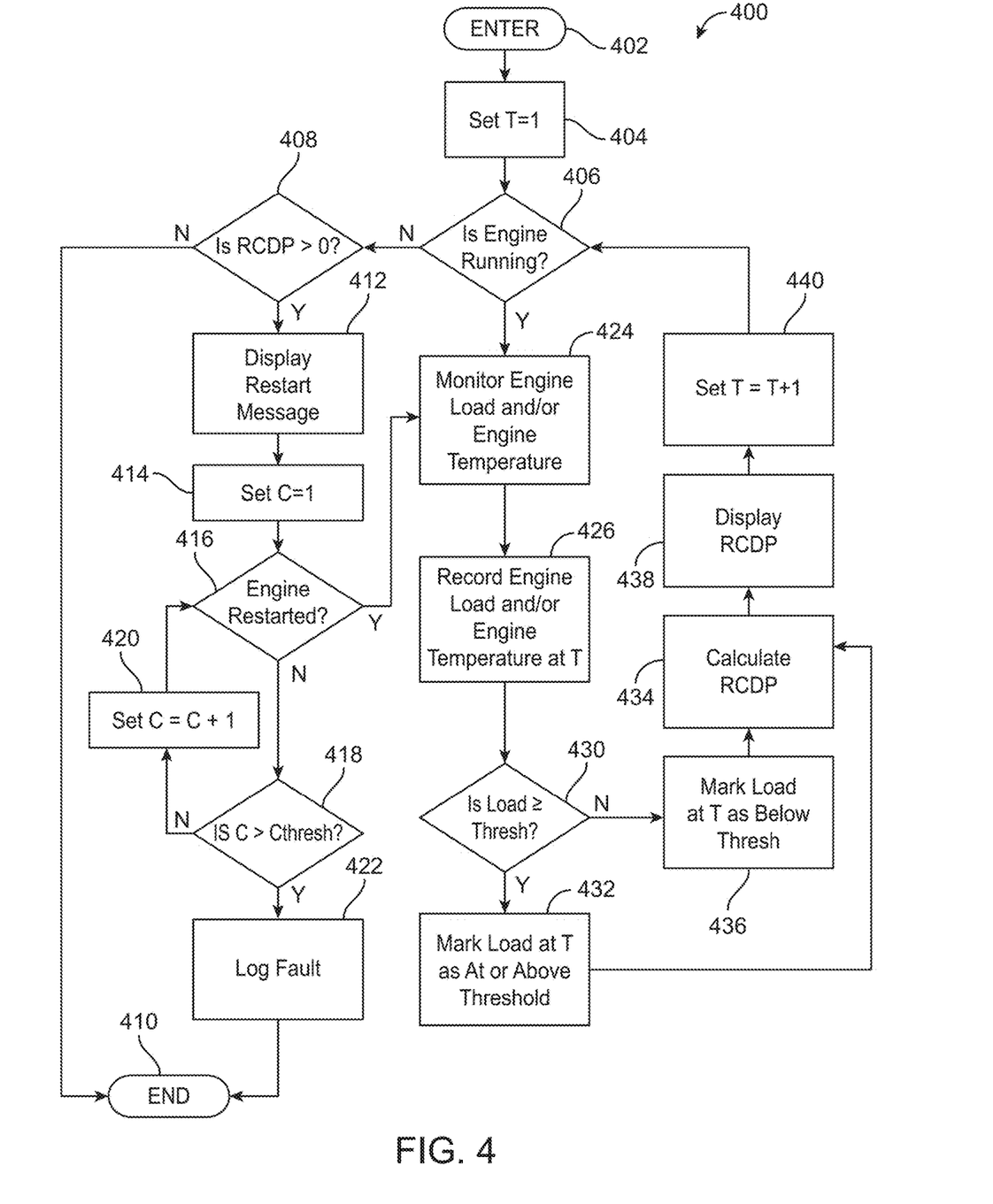
FIG. 4 is a flow chart illustrating an exemplary method for determining and indicating a recommended cool-down period of a prime mover of a turf maintenance vehicle.

FIG. 4 is a flow chart illustrating an exemplary method of determining and indicating real-time RCDP for an engine 104. While described herein in the context of an internal combustion engine, the method shown in FIG. 4 is equally applicable, with minimal alterations, to electric motors and other prime movers.

The process illustrated in FIG. 4 is, in some embodiments, controlled primarily by the EC 220 but may, as described above, be managed by an engine controller or a controller dedicated to RCDP determination and notification.

Figure 5:
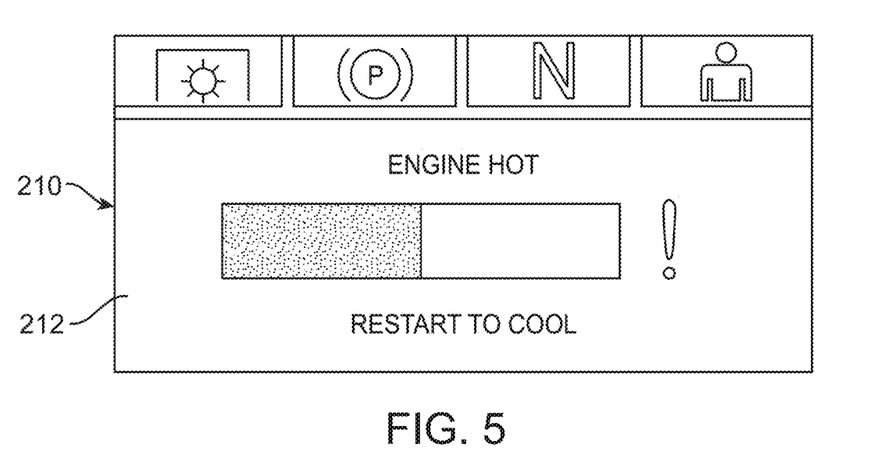
FIG. 5 is an exemplary visual display of a restart warning message generated by an engine cool-down determination system in accordance with embodiments of the present disclosure.

The process 400 is entered at 402 and a timer or counter T is set equal to 1 at 404. A determination is made at 406 as to whether the engine 104 is running, which may be determined, for example, by monitoring engine RPM. If the engine is stopped, the EC 220 determines whether RCDP is greater than zero seconds at 408. If not, the process ends at 410. If, however, RCDP is determined to be greater than zero seconds at 408, the EC 220 may issue or otherwise generate a notification at 412 requesting the operator to restart the engine. In some embodiments, the notification provided is a visual warning message displayed on the display 212 of the ID 210 as shown in FIG. 5.

The EC 220 may then wait for a predetermined restart threshold period of time (e.g., 15-60 seconds) to see if the engine is restarted. For example, a counter C may be set to 1 at 414. If it is determined that the engine has not been restarted at 416, the counter C is compared to a threshold (e.g., "Cthresh" of 15-60 seconds) at 418. If the counter C is equal to or below the threshold, the counter is incremented by one at 420 and control returned to 416.

If, on the other hand, the counter C is greater than Cthresh at 418, a permanent fault record may be logged or recorded at 422 (e.g., in the memory 219) after which the process ends at 410. Moreover, if the engine is determined to be re-started at 416, control is instead passed to 424 (described below).

If the engine is instead determined to be running at 406, the EC 220 may measure (e.g., at periodic time intervals) one or both of engine load and engine temperature, at time T, at 424. The EC may then store or record engine load and/or engine temperature at 426 at each interval (the sample period of time containing at least two such time intervals). If the reading of engine load is equal to or greater than a load threshold (e.g., at or above 75% of maximum load) at 430, the EC 220 may mark this load reading as at or above threshold at 432 and progress to 434. If, however, the answer at 430 is no, the EC may mark the load reading as below threshold at 436 before also progressing to 434.

Figure 6:
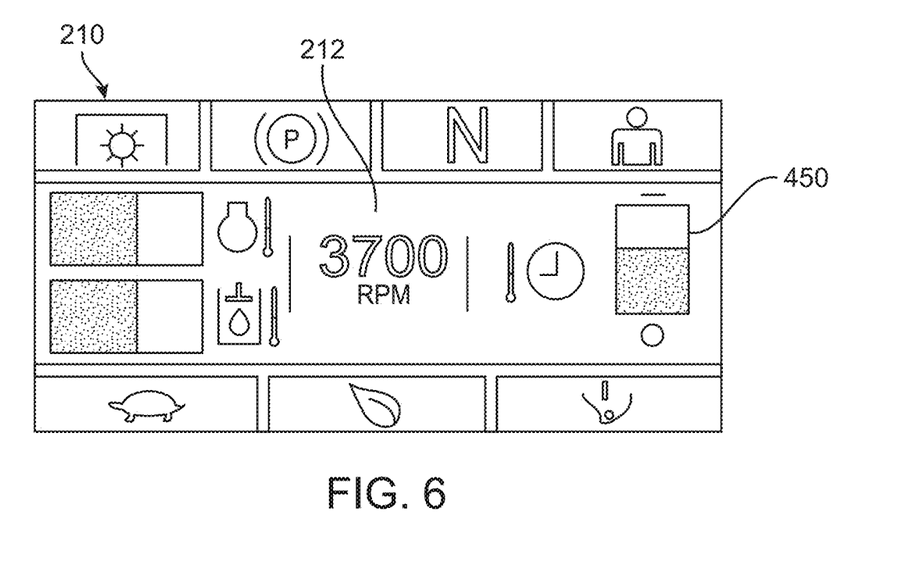
FIG. 6 is an exemplary visual notification of a recommended cool-down timer.

At 434, the EC 220 may calculate RCDP in accordance with embodiments of the present disclosure (see, e.g., Equations 1 and 2 herein). Once calculated, the EC may issue a notification of the RCDP, e.g., display a quantitative indicator of the RCDP, at 438. In some embodiments, this notification may be a graphical countdown bar 450 as shown in FIG. 6. This countdown bar may change (i.e., be updated) in real-time to reflect the remaining time to expiration of the RCDP at any point in time. The timer T may then be incremented at 440 and control returned to 406 as shown.

Systems and methods in accordance with embodiments of the present disclosure may thus determine a variable RCDP for an engine based upon its immediately preceding operating parameters. Moreover, a quantitative notification of RCDP may be provided so that the operator can observe, in real time, the time remaining in the RCDP before engine shut down should occur. As a result, issues related to premature engine shut down (e.g., overheating) may be minimized by allowing the engine to adequately cool before shutting down.

Other embodiments are also contemplated. For instance, the EC could interrupt shut down of the engine (e.g., override the ignition switch 202) if a shutdown command is received prior to expiration of the RCDP. An operator override could also be provided and adapted to selectively force engine shutdown when desired under this scenario. Still further, the EC could automatically restart the engine (if the engine is shut down prior to expiration of the RCDP) and let it run until the RCDP expires. This re-start feature could also be employed if the engine is inadvertently shut-off due to overload (e.g., stalled). In the latter case, the EC may restart the engine and set the engine speed to allow cooling.

The complete disclosure of the patents, patent documents, and publications cited herein are incorporated by reference in their entirety as if each were individually incorporated. In the event that any inconsistency exists between the disclosure of the present application and the disclosure(s) of any document incorporated herein by reference, the disclosure of the present application shall govern.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. A method for identifying a cool-down period for a prime mover of a grounds maintenance vehicle, the method comprising:
    periodically measuring and recording a temperature of and a load on the prime mover during a sample period of time;
    calculating, with an electronic controller (EC) associated with the vehicle:
        a load function of the prime mover, wherein the load function is based at least in part on the periodic measurements of load on the prime mover during the sample period of time; and
        a temperature function of the prime mover, wherein the temperature function is based at least in part on the periodic measurements of temperature of the prime mover during the sample period of time;
    calculating, with the EC, a recommended cool-down period (RCDP) to expire before shutdown of the prime mover should occur, wherein the RCDP is based upon the load function and the temperature function; and
    issuing, with the EC, a notification indicative of the RCDP; wherein calculating the load function comprises:
        determining a load ratio of a portion of the sample period of time at which the prime mover operated at or above 75% of a maximum rated load of the prime mover to the sample period of time, and
        calculating a product of the load ratio and a load weight factor.

2. The method of claim 1, wherein issuing the notification comprises displaying the notification on a display screen.

3. The method of claim 1, wherein issuing the notification comprises quantitatively updating the notification to reflect remaining time to expiration of the RCDP.

4. The method of claim 1, further comprising issuing a warning if the prime mover is shut down prior to expiration of the RCDP.

5. The method of claim 4, wherein issuing the warning comprises displaying a warning message on a display screen associated with the vehicle.

6. The method of claim 4, further comprising logging a fault record with the EC if the prime mover is not restarted within a restart threshold time period after issuing the warning.

7. The method of claim 1, further comprising interrupting shut down of the prime mover if a shutdown command is received prior to expiration of the RCDP.

8. The method of claim 1, wherein the sample period of time comprises a moving window of time.

9. The method of claim 8, wherein the moving window of time comprises a moving window of time of fixed duration.

10. The method of claim 1, wherein calculating the RCDP comprises summing the load function and the temperature function.

11. The method of claim 1, wherein calculating the temperature function comprises determining a temperature ratio of a maximum temperature of the prime mover during the sample period of time to a maximum allowable temperature.

12. The method of claim 11, further comprising subtracting a temperature compensation factor from one or both of the maximum temperature and the maximum allowable temperature before determining the temperature ratio.

13. The method of claim 11, wherein calculating the temperature function comprises calculating a product of the temperature ratio and a temperature weight factor.

14. A method for determining a cool-down period for a prime mover of a grounds maintenance vehicle, the method comprising:
at a time interval, measuring and storing, with an electronic controller (EC) associated with the vehicle a temperature of and a load on the prime mover;
selecting a sample period of time over which the prime mover has operated, the sample period of time containing at least two time intervals;
determining, with the EC:
a load function of the prime mover, wherein the load function is based at least in part upon the load measured and recorded during the sample period of time; and
a temperature function of the prime mover, wherein the temperature function is based at least in part upon the temperature measured and recorded during the sample period of time;
calculating, with the EC, a recommended cool-down period (RCDP) to expire before shutdown of the prime mover should occur, wherein the RCDP is based upon the load function and the temperature function; and
issuing, with the EC, a notification indicative of the RCDP, wherein determining the load function comprises:
determining a load ratio of a portion of the sample period of time at which the prime mover operated at or above a threshold load to the sample period of time; and
multiplying the load ratio by a load weight factor.

15. The method of claim 14, wherein determining the temperature function comprises:
determining a temperature ratio of a maximum temperature measured during the sample period of time to a maximum allowable temperature of the prime mover; and
multiplying the temperature ratio by a temperature weight factor.

16. The method of claim 14, wherein calculating the RCDP comprises multiplying a sum of the temperature function and the load function by a recommended cool-down period of the prime mover.

17. The method of claim 14, further comprising interrupting shut down of the prime mover if a shutdown command is received prior to expiration of the RCDP.

18. A grounds maintenance vehicle comprising:
a chassis;
ground-engaging members supporting the chassis upon a ground surface;
an implement attached to the chassis and adapted to perform a turf maintenance function;
a prime mover supported by the chassis and adapted to power the implement;
an electronic controller (EC) associated with the prime mover, the EC adapted to periodically measure and record a load parameter and a temperature parameter of the prime mover, wherein the EC is adapted to:
select a sample period of time over which the prime mover has operated;
determine:
a load function of the prime mover, wherein the load function is based at least in part upon the load parameter as periodically measured and recorded during the sample period of time;
a temperature function of the prime mover, wherein the temperature function is based at least in part upon the temperature parameter as periodically measured and recorded during the sample period of time;
calculate a variable recommended cool-down period (RCDP) by summing the load function and the temperature function; and
issue a notification indicative of the RCDP.

19. The vehicle of claim 18, wherein the notification is a visual notification displayed upon a display screen associated with the vehicle.

20. The vehicle of claim 18, wherein the prime mover comprises a diesel engine.

21. The vehicle of claim 18, wherein the implement comprises a cutting deck.

22. The vehicle of claim 18, wherein the EC is adapted to automatically restart the prime mover if the prime mover is shut down prior to expiration of the RCDP.

23. A method for identifying a cool-down period for a prime mover of a grounds maintenance vehicle, the method comprising:
periodically measuring and recording a temperature of and a load on the prime mover during a sample period of time;
calculating, with an electronic controller (EC) associated with the vehicle:
a load function of the prime mover, wherein the load function is based at least in part on the periodic measurements of load on the prime mover during the sample period of time; and
a temperature function of the prime mover, wherein the temperature function is based at least in part on the periodic measurements of temperature of the prime mover during the sample period of time;
calculating, with the EC, a recommended cool-down period (RCDP) to expire before shutdown of the prime mover should occur, wherein the RCDP is based upon the load function and the temperature function; and issuing, with the EC, a notification indicative of the RCDP, wherein calculating the temperature function comprises:
- determining a temperature ratio of a maximum temperature of the prime mover during the sample period of time to a maximum allowable temperature, and
- calculating a product of the temperature ratio and a temperature weight factor.

24. A method for determining a cool-down period for a prime mover of a grounds maintenance vehicle, the method comprising:
- at a time interval, measuring and storing, with an electronic controller (EC) associated with the vehicle a temperature of and a load on the prime mover;
- selecting a sample period of time over which the prime mover has operated, the sample period of time containing at least two time intervals;
- determining, with the EC:
  - a load function of the prime mover, wherein the load function is based at least in part upon the load measured and recorded during the sample period of time; and
  - a temperature function of the prime mover, wherein the temperature function is based at least in part upon the temperature measured and recorded during the sample period of time;
- calculating, with the EC, a recommended cool-down period (RCDP) to expire before shutdown of the prime mover should occur, wherein the RCDP is based upon the load function and the temperature function; and
- issuing, with the EC, a notification indicative of the RCDP, wherein calculating the RCDP comprises multiplying a sum of the temperature function and the load function by a recommended cool-down period of the prime mover.

* * * * *